(12) United States Patent
Streett et al.

(10) Patent No.: US 10,022,016 B1
(45) Date of Patent: Jul. 17, 2018

(54) MODULAR BARBECUE FOR VEHICLE TAILGATE

(71) Applicant: SWIFT ENGINEERING, INC., San Clemente, CA (US)

(72) Inventors: Andrew Streett, San Clemente, CA (US); Justin Malone, Carlsbad, CA (US)

( * ) Notice: Subject to any disclaimer, the term of this patent is extended or adjusted under 35 U.S.C. 154(b) by 0 days.

(21) Appl. No.: 15/657,045

(22) Filed: Jul. 21, 2017

(51) Int. Cl.
*B62D 33/02* (2006.01)
*A47J 37/06* (2006.01)
*B62D 33/027* (2006.01)
*B60R 9/00* (2006.01)
*B62D 25/00* (2006.01)

(52) U.S. Cl.
CPC ...... *A47J 37/0623* (2013.01); *B62D 33/0273* (2013.01); *B60R 9/00* (2013.01); *B62D 25/00* (2013.01)

(58) Field of Classification Search
CPC .. B60R 9/00; B60R 7/00; B62D 25/00; B62D 25/08; F24C 15/00
USPC .......... 126/276, 25 R, 25 B, 41 R; 296/57.1; 99/339
See application file for complete search history.

(56) References Cited

U.S. PATENT DOCUMENTS

| | | | |
|---|---|---|---|
| 3,692,351 A | 9/1972 | Christopher et al. | |
| 4,830,242 A * | 5/1989 | Painter | B60P 3/32 224/404 |
| 5,313,928 A | 5/1994 | Rodgers et al. | |
| 5,518,158 A | 5/1996 | Matlack et al. | |
| 5,823,595 A | 10/1998 | Tronco et al. | |
| 6,206,445 B1 | 3/2001 | Brooks et al. | |
| 6,293,602 B1 | 9/2001 | Presley et al. | |
| 6,364,391 B1 * | 4/2002 | Everett | B60N 2/24 296/51 |
| 6,588,822 B1 | 7/2003 | Duvall et al. | |
| 6,641,190 B2 | 11/2003 | Kirchhoff et al. | |
| 6,811,067 B2 * | 11/2004 | Muizelaar | B62D 33/027 224/404 |
| 6,843,519 B2 | 1/2005 | Ojanen et al. | |

(Continued)

FOREIGN PATENT DOCUMENTS

CA 2418606 C 6/2010

OTHER PUBLICATIONS

J.W.Winco, Inc., "Toggle Latches Information Sheet", available at http://www.jwwinco.com/products/section15/gn831/index.html, 2 pgs, exact publication date unknown (website visited on Aug. 19, 2017).

(Continued)

*Primary Examiner* — Gregory Huson
*Assistant Examiner* — Nikhil Mashruwala
(74) *Attorney, Agent, or Firm* — Perkins Coie LLP (57) ABSTRACT

A tailgate for a vehicle includes a plurality of modules, which may be interchangeable. The modules may include a removable storage tray, a cutting board, a grill, a refrigeration unit, a television, or speakers. The grill may include a grill base with control elements, at least one flame element, at least one heat spreader positioned over the flame element, and a grill grate positioned over the heat spreader. The tailgate may include removable or rotatable lids to cover the modules. A layer of insulation may be positioned around the grill base. The tailgate may include a funnel and a removable tray to collect debris from the grill.

20 Claims, 6 Drawing Sheets

(56) References Cited

U.S. PATENT DOCUMENTS

| | | | |
|---|---|---|---|
| 6,866,035 B2 | 3/2005 | Haemerle et al. | |
| 6,983,972 B2 | 1/2006 | Tan et al. | |
| 6,994,363 B2 | 2/2006 | Seksaria et al. | |
| 7,118,153 B2 | 10/2006 | Kitayama et al. | |
| 7,213,858 B2 | 5/2007 | Smith | |
| 7,261,357 B1 | 8/2007 | Bechen et al. | |
| 7,628,439 B1 | 12/2009 | Strong et al. | |
| 7,798,139 B2* | 9/2010 | Gagas | A47J 37/0704 126/1 R |
| 7,905,532 B2 | 3/2011 | Johnson et al. | |
| 8,123,271 B1 | 2/2012 | Wimberley et al. | |
| 8,201,869 B1 | 6/2012 | Butlin, Jr. et al. | |
| 8,348,325 B2 | 1/2013 | Hausler et al. | |
| 8,651,351 B2* | 2/2014 | Fowler | B60R 5/04 224/281 |
| 8,763,848 B2* | 7/2014 | Carey | A45C 11/20 206/701 |
| 9,162,626 B1* | 10/2015 | Nelson | B60R 9/00 |
| 9,308,947 B2* | 4/2016 | Kmita | B60R 9/06 |
| 2002/0140252 A1* | 10/2002 | Neville | B60P 3/341 296/164 |
| 2004/0026946 A1* | 2/2004 | Reed, III | B60P 3/0257 296/24.3 |
| 2004/0173201 A1 | 9/2004 | Haemerle et al. | |
| 2005/0062309 A1 | 3/2005 | Juzwiak et al. | |
| 2006/0027618 A1* | 2/2006 | Williams | B60R 9/06 224/519 |
| 2007/0006867 A1* | 1/2007 | Karney | A47J 37/07 126/37 B |
| 2008/0190977 A1* | 8/2008 | Estabrook | B60R 9/00 224/404 |
| 2008/0245357 A1* | 10/2008 | Meether | A47J 37/0704 126/25 R |
| 2009/0174212 A1 | 7/2009 | Donoho et al. | |
| 2012/0251698 A1* | 10/2012 | Dennis | A47J 37/0709 426/523 |

OTHER PUBLICATIONS

McMaster-Carr, "Multidirectional Ball-Style Grab Latch Order Sheet", available at https://www.mcmaster.com/#1328a1/=zu4js, 1 pg, exact publication date unknown, believed to be publically available at least as early as Jul. 2017 (website visited on Aug. 19, 2017).

* cited by examiner

MODULAR BARBECUE FOR VEHICLE TAILGATE

BACKGROUND

Trucks or other vehicles, such as sport-utility vehicles (SUVs), pickup trucks, or "utes," often have a drop-down tailgate that provides access to a cargo area, such as a bed. Most tailgates have a closed or vertical orientation in which the tailgate is latched to the sides of the vehicle. When the latch is released, the tailgate may be lowered to a generally horizontal orientation to allow access to the bed. The tailgate may be supported in the horizontal orientation by one or more struts, bars, cables, or other supports.

Most tailgates provide only limited functionality. For example, a tailgate in the horizontal or open orientation may provide a stepping point for ingress and egress into and out of the bed or other cargo area. It may also provide support for objects extending beyond the cargo area.

Some existing tailgate designs attempt to add further utility to the tailgate by including workbenches, toolboxes, steps, ramps, or other storage or utility features in the tailgate. For example, a grill may be integrated into a tailgate. But design flaws in existing tailgate grills result in uneven heating, poor management of grease and food debris, and poor management of heat that results in an unacceptable risk of burns or damage to the host vehicle.

SUMMARY

A tailgate for a vehicle includes a plurality of modules. In some embodiments, the modules may be interchangeable. The modules may be configured to be removed and replaced with other modules. The modules may include a removable storage tray, a cutting board, a grill, a refrigeration unit, a television, or speakers. The grill may include a grill base with control elements, at least one flame element, at least one heat spreader positioned over the flame element, and a grill grate positioned over the heat spreader. In some embodiments, the tailgate includes one or more removable or rotatable lids to cover one or more of the modules. In some embodiments, the grill base includes or is covered around one or more of its sides or base with at least one layer of insulation. In some embodiments, the heat spreader includes a plate oriented at an angle less than 15 degrees relative to a bottom of the grill base. In some embodiments, the tailgate includes a funnel and a removable tray. The removable tray may be configured to collect debris from the funnel, which may be configured to collect debris from the grill. In some embodiments, the tailgate includes a fuel valve assembly.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION

The present technology is directed to a modular barbecue system for vehicle tailgates, and associated systems and methods. Various embodiments of the technology will now be described. The following description provides specific details for a thorough understanding and enabling description of these embodiments. One skilled in the art will understand, however, that the invention may be practiced without many of these details. Additionally, some well-known structures or functions, such as structures or functions common to cars, trucks, or other vehicles, tailgates, beds, and other associated cargo retention elements, and grills, may not be shown or described in detail so as to avoid unnecessarily obscuring the relevant description of the various embodiments. Accordingly, embodiments of the present technology may include additional elements or exclude some of the elements described below with reference to FIGS. 1-9, which illustrate examples of the technology.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

Specific details of several embodiments of the present technology are described herein with reference to trucks and tailgates. The technology may also be used in other vehicles and in other platforms, or in other industries in which it may be desirable to provide a stowable and deployable grill or other items, such as in boating or aviation.

Figure 1:
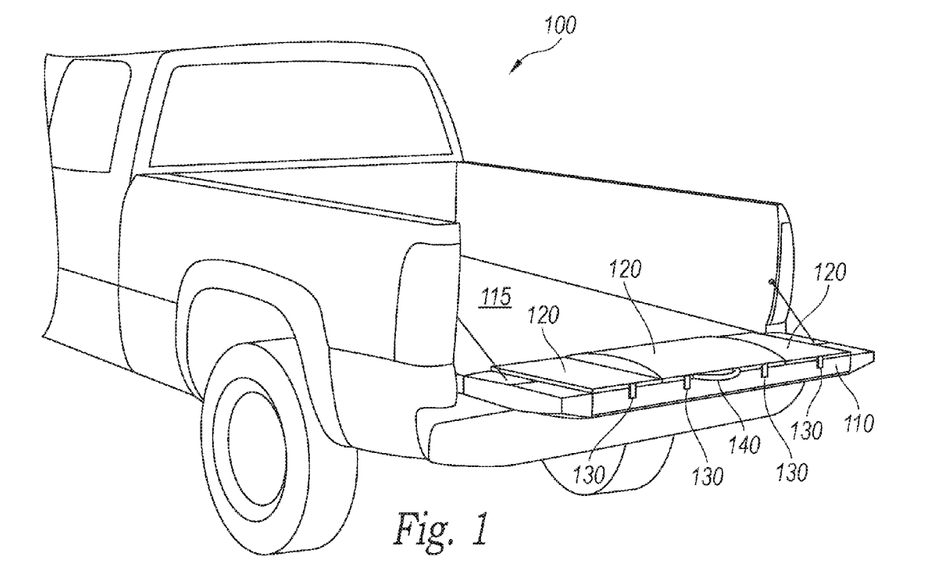
FIG. 1 illustrates a rear perspective view of a truck with a tailgate according to an embodiment of the present technology.

Turning now to the drawings, FIG. 1 illustrates a truck 100 with a tailgate 110 in an open or horizontal orientation. The tailgate 110 may be positioned adjacent to a cargo area or bed 115. The tailgate 110 may be rotatable to a vertical or closed orientation in which it may be secured or latched in the vertical or closed orientation to close off a rear portion of the cargo area or bed 115.

As described in further detail below, one or more interchangeable modules are contained in the tailgate 110. Each module may include one or more functional units, such as a grill, one or more cutting boards or preparation surfaces, a television, a sound system with optional speakers, a cold storage tray, a storage area, or other functional units that may be used with a transportable grill or entertainment system according to embodiments of the technology. Each of the modules may be removable or replaceable with the same or another type of module.

The modules may be covered with one or more articulating lids 120 that may be secured in a closed position illustrated in FIG. 1 using one or more latches, catches, hooks, locks, magnets, or other suitable latching elements 130. In some embodiments, one or more modules may not have a lid 120 and instead may be open or uncovered. One or more of the lids 120 may include a handle 140 to assist a user in opening or closing the lid 120. The handle 140 may protect a user against heat stored in a lid 120. The handle 140 may be formed with wood or another suitable heat-insulative or heat-resistant material, and it may be thermally separated from the lid 120 using one or more ceramic elements, such as ceramic washers. Ceramic elements or other thermally-resistant elements may be positioned at other touch points to protect a user from burns.

Figure 2:
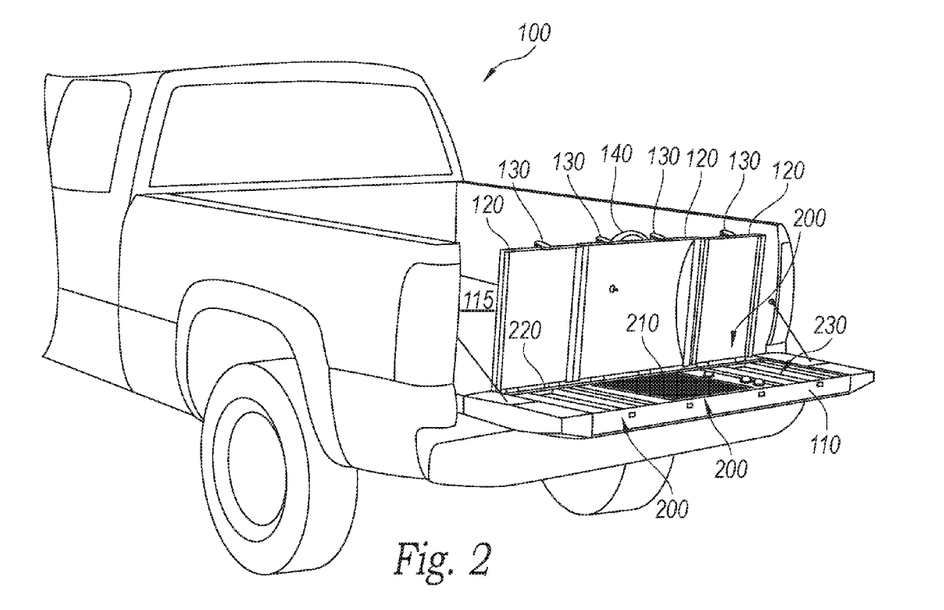
FIG. 2 illustrates a rear perspective view of a truck with a tailgate according to an embodiment of the present technology, in which the tailgate is in an open or horizontal orientation and lids are in an open orientation to allow access to one or more modules, such as a grill.

FIG. 2 illustrates the tailgate 110 in an open or horizontal orientation, and the optional lids 120 in an open configuration. When the lids 120 are open, they may be in a generally vertical orientation or they may be in another orientation, such as at an acute angle (for example, leaning toward the rear of the vehicle) or an obtuse angle relative to the tailgate 110 (leaning towards the bed 115). In some embodiments, the lids 120 may be removed entirely.

When the lids 120 are open (or removed entirely), one or more of the modules 200 are accessible for use, maintenance, cleaning, or other operations. For example, in some embodiments, one or more modules may include a grill 210 for grilling food. In some embodiments, a module may include a cutting board 220. In some embodiments, a module may include a storage area or storage tray 230 for storing food, tools, cleaning equipment, or other items. In some embodiments, the storage tray 230 may be insulated or refrigerated to keep food or beverages cool.

In some embodiments, other suitable refrigerator units may form one or more of the modules 200. In some embodiments, a cutting board may cover an opening in the storage tray 230. In some embodiments, a television or speaker system may be included in a module 200, with video or audio auxiliary inputs, for example. In some embodiments, a spice or seasoning rack may be included in a module 200. In some embodiments, a module 200 may include a table attached to or removable from the tailgate 110. The modules 200 may be removable, interchangeable, or replaceable with the same or a different kind of module to customize the tailgate 110 to a particular application or event. For example, in some embodiments, the grill 210 may be omitted and the tailgate 110 may include several storage trays 230.

Figure 3:
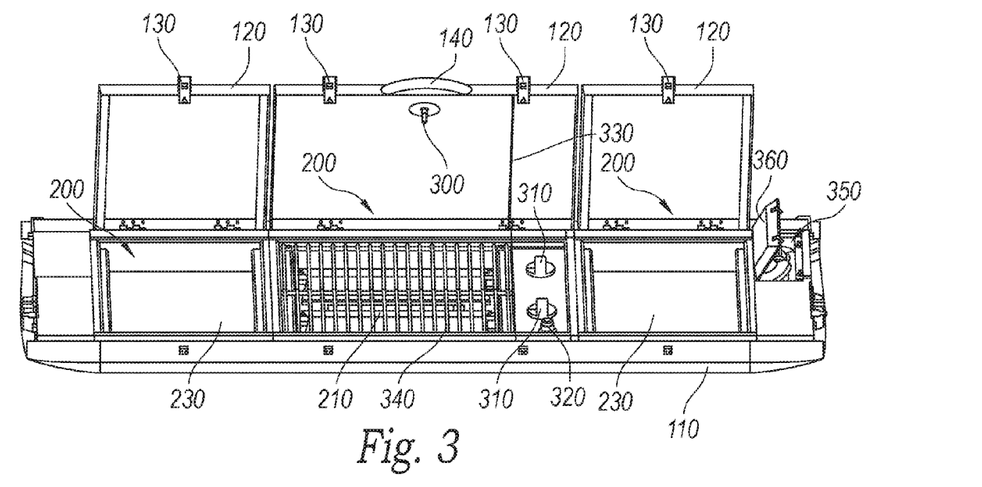
FIG. 3 illustrates a rear perspective view of a tailgate according to an embodiment of the present technology, in which the lids are in an open configuration.

FIG. 3 illustrates a rear perspective view of a tailgate 110 in which the lids 120 are in an open configuration to allow access to the modules 200, such as the grill 210. In some embodiments, a thermometer 300 may be positioned in one or more of the lids 120 with a display facing away from the lid 120 when the lid 120 is in a closed position (as illustrated in FIG. 1). The thermometer 300 allows a user to monitor temperature of the grill 210. In some embodiments, a vent may be positioned in a lid 120 in place of, or in addition to, the thermometer 300. Such a vent or vents allow smoke to be released from the grill 210 before a user opens the lids 120.

In some embodiments, the module 200 with the grill 210 may further include control elements 310, such as knobs or dials, for operating the grill 210. An igniter switch 320 may also be positioned in the module 200 having the grill 210 to ignite the flame elements of the grill 210 (described below). In some embodiments, a divider 330 may extend from an interior surface of the lid 120 to act as a barrier to shield the control elements 310, igniter switch 320, or other control elements or display devices from the remainder of the grill 210, such as from a grill grate 340 upon which the food may be cooked. The divider 330 may protect the control elements from heat, flame, or splatter.

A fuel valve assembly 350 may be positioned in the tailgate 110, for example, near an edge of the tailgate 110 (such as an edge near a hinge of the tailgate 110 or side of the truck). The valve assembly 350 may provide a connection point for a fuel source (such as a propane tank or other suitable cooking-fuel container). For example, a fuel container integrated with the truck, or a fuel container located in the cargo area 115 or elsewhere in the truck 100, may be connected to the valve assembly 350 with a suitable plumbing connector. A lid 360 may be positioned over the valve assembly 350 to protect it from the environment or from other wear.

Figure 4:
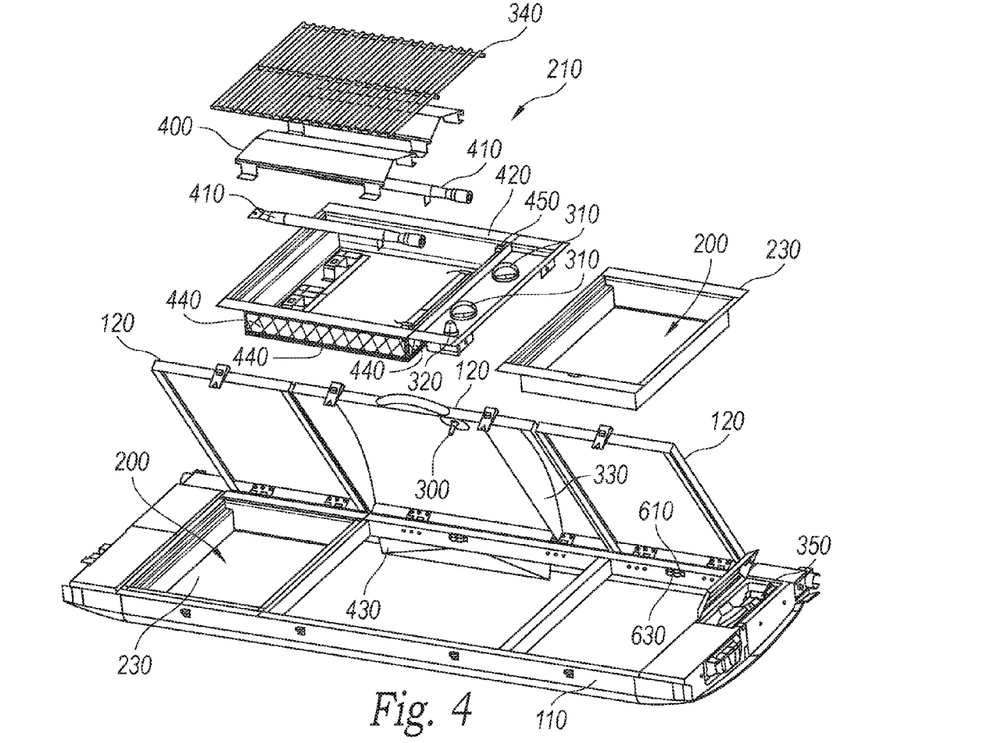
FIG. 4 illustrates a partially exploded schematic view of the tailgate shown in FIG. 3.

FIG. 4 illustrates a partially exploded schematic view of the tailgate 110 according to an embodiment of the present technology. One storage tray 230 is illustrated as remaining mounted in the tailgate 110, while another storage tray 230 is illustrated as being removed from the tailgate 110. The grill 210 is illustrated as being removed from the tailgate 110 and separated into parts to illustrate various components of the grill 210. Beneath the grill grate 340 may be one or more heat spreaders 400. Although a single integral heat spreader 400 is illustrated in FIG. 4, a plurality of separate heat spreaders 400 may be included. Beneath the heat spreader(s) 400 may be one or more burners or flame elements 410 (such as two flame elements 410). In some embodiments, the flame elements 410, heat spreader(s) 400, and grill grate 340 may each be attached to a grill tray or grill base 420 that is removably mounted in the tailgate 110. The grill base 420 may also support the control elements 310, the igniter switch 320, or other suitable components. For example, the grill base 420 may support a gas manifold for distributing gas to the flame elements 410.

The flame elements 410 provide flames using fuel from the fuel source via the valve assembly 350. The flames may be ignited using the igniter switch 320, and regulated using the control elements 310. The flames heat the heat spreader(s) 400, which in turn radiate heat to the grill grate 340 and any food thereon.

In some embodiments, an angled or funnel element 430 may be positioned in the tailgate 110 to collect and funnel grease or other debris out of the tailgate 110 when the tailgate 110 is in the vertical or closed position. Accordingly, after use of the grill 210, a user may close the tailgate 110 to allow grease or debris to collect in a tray (described below) or otherwise exit the tailgate 110 for simple cleanup.

In some embodiments, a coating, jacket, or other layer of insulation 440 may be positioned around the sides and bottom or other outer surfaces of the grill base 420. The insulation 440 may reflect heat into the grill base 420 or otherwise prevent or resist heat from spreading out of the grill base 420 and grill 210. The insulation 440 may be positioned on the sides of the grill base 420 to prevent or resist heat from spreading to neighboring modules 200. The insulation 440 may be positioned on an underside or bottom of the grill base 420 to prevent or resist damage to the tailgate 110. For example, the insulation 440 may prevent a user or passerby from getting burned by a grill 210 that has recently been used (by preventing heat from soaking into the tailgate 110). The insulation 440 may also prevent damage to exterior paint on the tailgate 110. Accordingly, the insulation 440 provides enhanced safety for the grill 210. In some embodiments, the insulation 440 may be formed with a fiberglass interior surrounded by outer layers of metal foil (such as aluminum foil). In some embodiments, the insulation 440 may include fiberglass (with or without metal foil), multi-walled ceramic materials, vacuum vessels, foam, wood, or other materials with thermal resistance properties suitable for preventing or resisting heat transfer. In some embodiments, the insulation may be attached to a frame of the tailgate or to other modules.

In some embodiments, one or more U-shaped clip elements 450 (only one is visible in FIG. 4) may be positioned around the perimeter of the grill base 420 to support and retain the grill grate 340. For example, there may be four clip elements 450, with one positioned at each corner of the grill grate 340.

Figure 5:
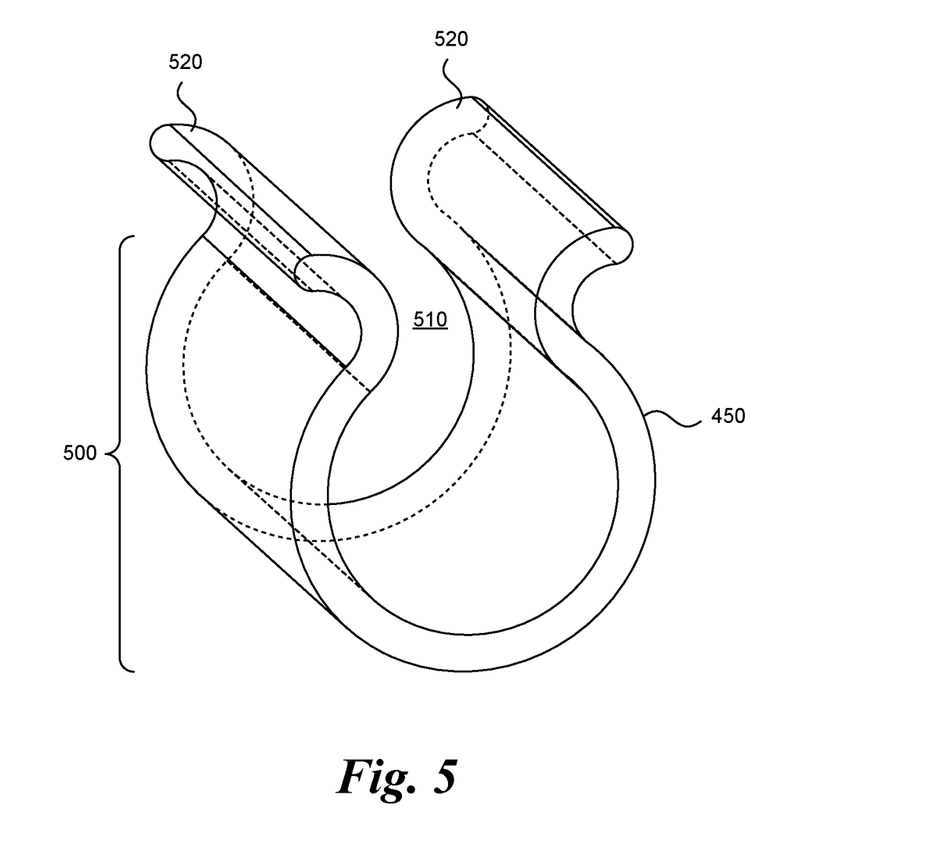
FIG. 5 illustrates a clip element for holding a grill grate according to an embodiment of the present technology.

FIG. 5 illustrates a U-shaped clip element 450 according to an embodiment of the present technology. The clip element 450 may be bolted, glued, or otherwise fastened to the grill base 420. The clip element 450 may include a round base 500 shaped to generally conform to the shape of a wire in the grill grate 340. The clip element 450 may be flexible and it may include an opening 510 wide enough to accommodate a wire in the grill grate 340 when the clip element 450 flexes, but narrow enough to generally retain the wire to removably and securely mount the grill grate 340. Rounded lips 520 may flare outwardly to improve ease of receiving the wire of the grill base 420 into the clip base 500. The clip element(s) 450 allow the grill grate 340 to be removed from and replaced into the grill 210. They may also absorb vibration to prevent damage to the assembly during use and transportation. The clip element(s) 450 may be formed using steel or another suitable material capable of withstanding temperatures associated with a grill.

Figure 6:
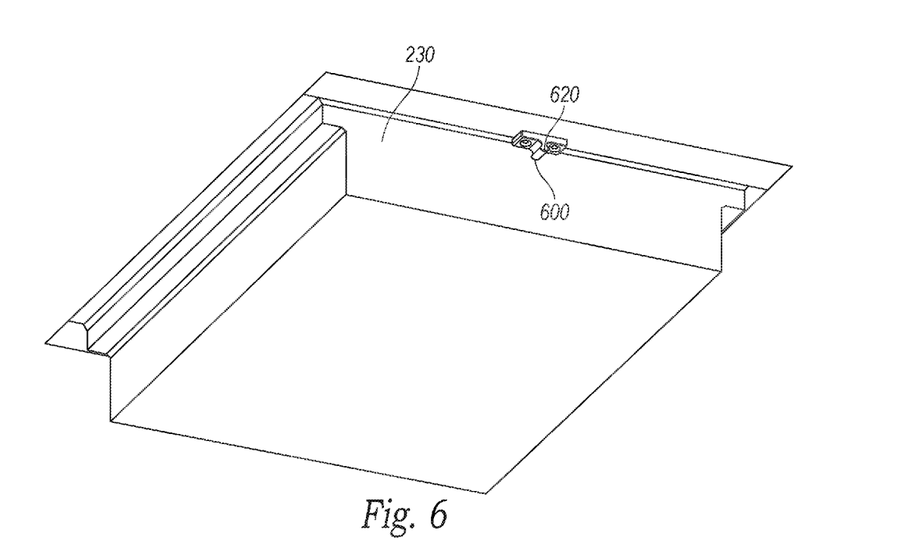
FIG. 6 illustrates a rear underside view of a storage tray or other module according to an embodiment of the present technology.

FIG. 6 illustrates a rear underside view of a storage tray 230 according to an embodiment of the present technology. In some embodiments, a latch mechanism formed by a first member 600 and a second member 610 (see FIG. 4) releasably retain the storage tray 230 in the tailgate. For example, either the first member 600 or the second member 610 may be attached to the storage tray 230, while the other of the first member 600 or the second member 610 may be attached to the tailgate. In one embodiment, the first member 600 includes an elongated portion 620 that may be received in a slot 630 of the second member 610 (see FIG. 4). The slot 630 may include a spring element or other elements for providing resilience or friction to retain the elongated portion 620, thereby releasably retaining the storage tray 230 in the tailgate. Although a storage tray 230 is illustrated in FIG. 6 with the latch mechanism, such a latch mechanism may be used to releasably retain other modules 200, such as the grill 210 or a cutting board 220 (see FIG. 2). Although one latch mechanism (including one first member 600 and one second member 610) is described herein, a plurality of latch mechanisms may be use to retain the modules 200 in the tailgate (such as two or more latch mechanisms on each side of a module). The latch mechanism reduces vibration between the modules 200 and the tailgate 110 to protect the modules 200.

Figure 7:
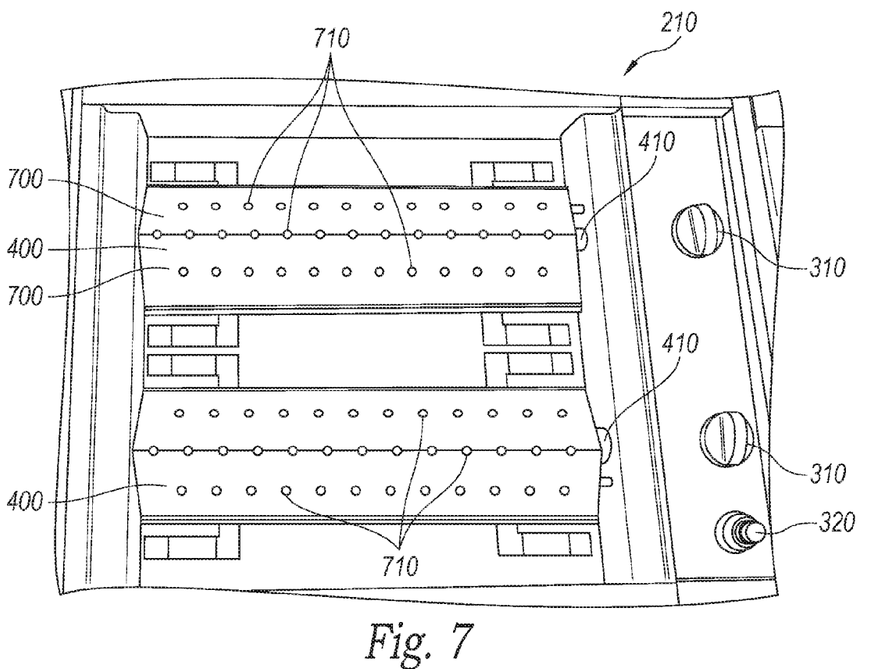
FIG. 7 illustrates a view of a grill according to an embodiment of the present technology.

FIG. 7 illustrates a grill 210 having two heat spreaders 400, although more or fewer heat spreaders 400 may be used. Each heat spreader 400 lies over a burner or flame element 410. Due to space limitations in a typical vehicle tailgate (and the small and narrow space in the grill base 420), the heat spreaders may be relatively shallow and flat. For example, the grill base 420 may be approximately two to three inches deep (in contrast to existing standard backyard barbecue grills, which can be twelve to sixteen inches deep, with as much as eight inches of space between the burners and the top or bottom of the grills).

In some embodiments, each of two main plates 700 per heat spreader 400 may be oriented at an angle between 5 degrees and 45 degrees (for example, approximately 15 degrees) relative to the level bottom of the grill base 420. In other embodiments, the plates 700 may be oriented at other angles suitable to fit inside the grill 210 while providing even heating along the length and width of the heat spreaders 400 due to radiation and convection and allowing food or grease to drip away from the heat spreaders 400. For example, one or more of the plates 700 may be oriented at a minimal angle to barely allow grease to drip off the plate(s) 700. In order to obtain even heating, the heat spreader 400 preferably has some slope or angle between the two main plates, and the heat spreader 400 is preferably relatively long and wide. Only a small flame is needed to spread the heat for use of the grill 210. In some embodiments, the grill 210 cooks food using convection and radiation. In some embodiments, one or more heat spreaders 400 may have holes or perforations 710 to allow flames or additional heat to pass through the heat spreaders 400.

Figure 8:
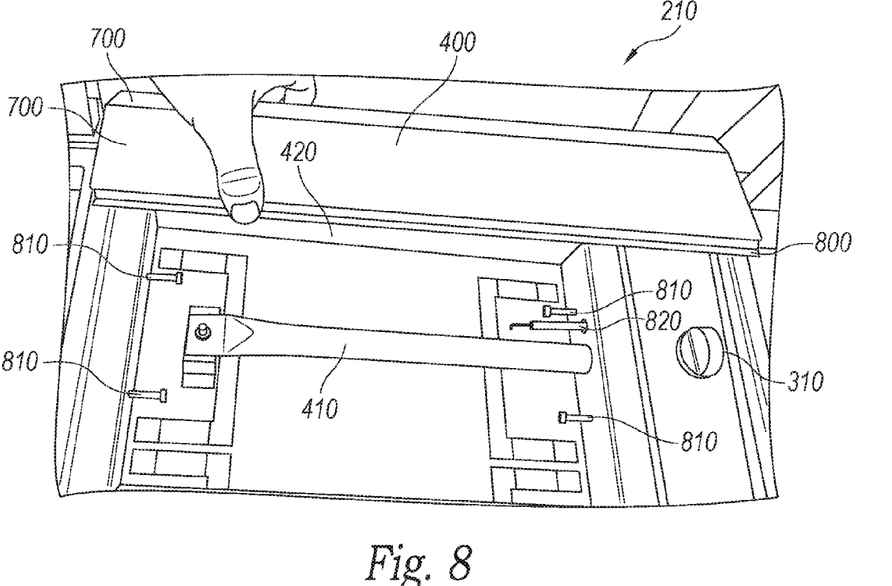
FIG. 8 illustrates a user removing or replacing a heat spreader in the grill.

FIG. 8 illustrates a user removing or replacing a heat spreader 400 in the grill 210. In some embodiments, a heat spreader 400 may be flexible and resilient. The heat spreader 400 may have a lip portion 800 on each side to fit under a bolt or other protruding element 810. By squeezing the heat spreader 400, a user may position each of the lip portions 800 (on opposite sides of the heat spreader 400) under the protruding elements 810. Upon releasing the heat spreader 400, the lip portions 800 press against the protruding elements 810 due to the resilient flexibility of the heat spreader 400. Accordingly, the heat spreader 400 is securely retained in the grill 210.

An igniter 820 may be positioned next to each flame element 410 to ignite each flame element 410 for use. The removable and replaceable nature of the heat spreaders 400 provides for ease in cleaning each element of the grill 210. In some embodiments, the protruding elements 810 are positioned to hold the heat spreader(s) 400 a distance away from a bottom surface of the grill base 420 in order to allow grease or other debris to pass beneath the heat spreaders 400 for easier cleanup (a user may remove the heat spreader(s) 400 and flame element(s) 410).

Figure 9:
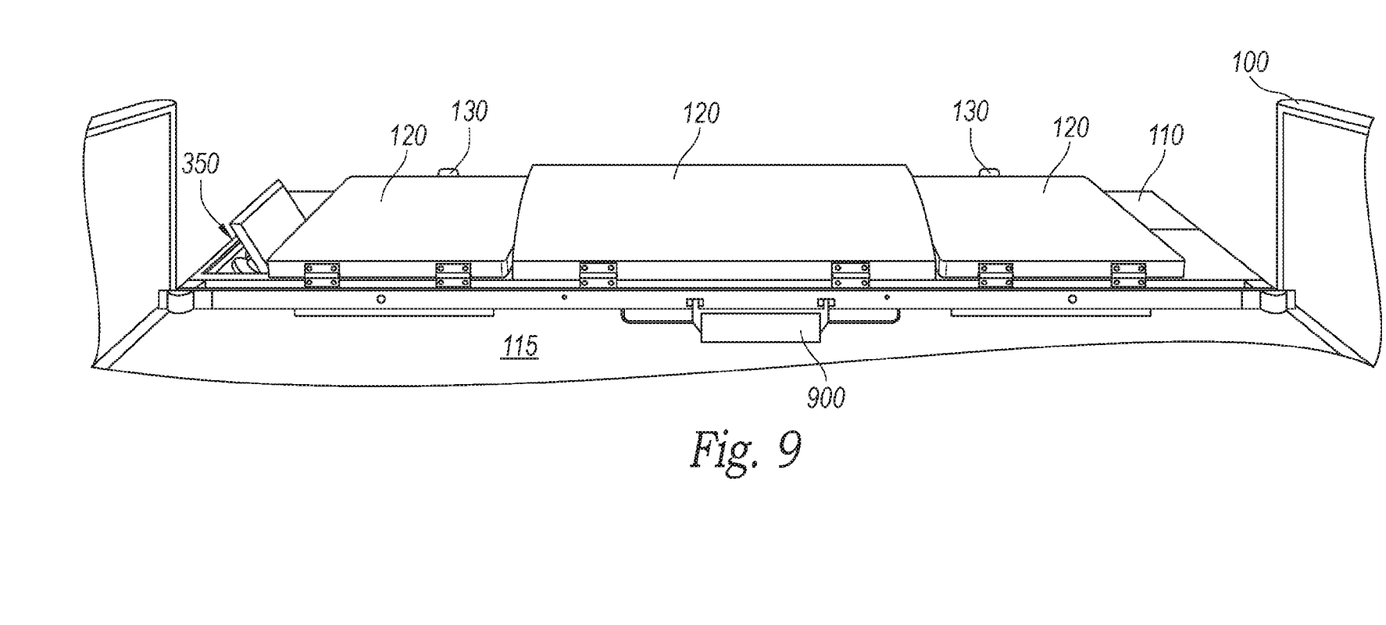
FIG. 9 illustrates a front perspective view of a tailgate according to an embodiment of the present technology (looking out of the cargo area or bed towards the rear of the truck).

FIG. 9 illustrates a front perspective view of a tailgate 110 according to an embodiment of the present technology (looking out of the cargo area or bed 115 towards the rear of the truck 100). A grease tray 900 may be positioned on the tailgate 110 near the cargo area or bed 115 so that when the tailgate 110 is closed, the grease tray 900 is below the tailgate 110 to collect grease and debris from the funnel element 430 (see FIG. 4). The grease tray 900 may be removable for emptying or cleaning. It may be mounted to the tailgate 110 using a latch mechanism such as the latch mechanism described and illustrated above with respect to FIG. 6, or it may be mounted to the tailgate using other suitable releasable connections.

Although a truck 100 is illustrated and described herein, tailgates according to various embodiments of the present technology may be implemented on an SUV, ute, minivan, boat, or other suitable vehicle. It may also be used in any implementation that may be folded down, such as on something other than a vehicle.

Embodiments of the present technology provide several advantages. For example, a user may be able to prepare food with the grill, cutting board, and storage tray with easy cleanup as a result of the removable nature of the constituent elements described herein. After use of the grill, a user may close the tailgate to allow grease and other debris to fall toward the funnel element (such as the funnel element 430) and the debris or grease tray (such as the grease tray 900). A user may remove and empty the grease tray 900 at a convenient time. Insulation (such as the insulation 440 described above) surrounding the grill 210 protects a user from getting burned after using the grill 210 when the user is raising or lowering the tailgate. The modular nature of the grill 210, cutting board 220, storage tray 230, or other modules 200 allows for customization of the tailgate assembly for various events or other needs. Accordingly, embodiments of the present technology provide a safe, modular, and easily maintained tailgate grill.

From the foregoing, it will be appreciated that specific embodiments of the disclosed technology have been described for purposes of illustration, but that various modifications may be made without deviating from the technology, and elements of certain embodiments may be interchanged with those of other embodiments, and that some embodiments may omit some elements. For example, in various embodiments of the present technology, other types of burners or flame elements may be used. In some embodiments, charcoal may be used in the grill. In some embodiments, other clip elements may be used in place of the clip element 450 described above. In some embodiments, a latch mechanism or other device for removably retaining the modules 200 may have other suitable forms.

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology may encompass other embodiments not expressly shown or described herein, and the invention is not limited except as by the appended claims.

What is claimed is:

1. A passenger vehicle comprising:
   a cargo area; and
   a tailgate positioned adjacent to the cargo area, the tailgate comprising a plurality of interchangeable modules configured to be removed and replaced with other modules; wherein
      at least one of the modules comprises a removable storage tray;
      at least one of the modules comprises a cutting board; and
      at least one of the modules comprises a grill, wherein the grill comprises a grill base having control elements, at least one flame element, at least one heat spreader positioned over the flame element, and a grill grate positioned over the heat spreader; and wherein
      the tailgate further comprises a grease tray positioned below the grill when the tailgate is in a vertically closed orientation, the grease tray configured to collect grease or debris from the grill.

2. The passenger vehicle of claim 1 wherein the tailgate comprises one or more removable or rotatable lids positioned to cover one or more of the modules.

3. The passenger vehicle of claim 2 wherein at least one of the one or more lids comprises a thermometer.

4. The passenger vehicle of claim 2 wherein at least one of the one or more lids comprises a divider configured to form a barrier between the control elements and the grill grate when the at least one of the one or more lids is in a closed position.

5. The passenger vehicle of claim 1 wherein the grill base comprises sides and a bottom, and wherein at least one layer of insulation is positioned on the sides and on the bottom.

6. The passenger vehicle of claim 1 wherein the heat spreader comprises a plate oriented at an angle less than 15 degrees relative to a bottom of the grill base.

7. The passenger vehicle of claim 1 wherein the heat spreader is flexible and configured to be squeezed between protruding elements attached to the grill base.

8. The passenger vehicle of claim 1 wherein the tailgate further comprises a funnel positioned below the grill when the tailgate is in the vertically closed orientation.

9. The passenger vehicle of claim 1 wherein the grease tray is removable.

10. The passenger vehicle of claim 1 wherein at least one of the modules comprises refrigeration.

11. A tailgate for a vehicle, the tailgate comprising:
    a first side positioned adjacent to a hinge of the tailgate and a second side positioned opposite the first side, wherein when the tailgate is in a horizontally open orientation, the first side is positioned between the hinge and the second side of the tailgate;
    a plurality of removable and replaceable modules, wherein at least one of the modules comprises a grill;
    a funnel positioned between the first side of the tailgate and the grill when the tailgate is in the horizontally open orientation; and
    a removable grease tray positioned below the tailgate when the tailgate is in a vertically closed orientation; wherein
    the removable grease tray is configured to collect grease or debris from the funnel.

12. The tailgate of claim 11, further comprising a removable or rotatable lid configured to cover at least one of the modules.

13. The tailgate of claim 11, wherein the grill comprises flame element, a heat spreader positioned over the flame element, and a grill grate positioned over the heat spreader.

14. The tailgate of claim 13 wherein the heat spreader is flexible and configured to be squeezed between protruding elements in the grill.

15. The tailgate of claim 13 wherein the heat spreader comprises a plate oriented at an angle less than 15 degrees relative to a bottom of the grill.

16. The tailgate of claim 11 wherein the grill comprises insulation at least partially surrounding one or more sides and a bottom of the grill.

17. The tailgate of claim 11 wherein the modules are interchangeable, and wherein one or more of the modules comprises a storage tray or a cutting board.

18. A tailgate for a vehicle, the tailgate comprising:
a grill base removably mounted in the tailgate;
insulation attached to a bottom and one or more sides of the grill base;
at least one control element attached to the grill base;
a flame element attached to the grill base;
a heat spreader attached to the grill base;
a grill grate attached to the grill base; and
a funnel; wherein
   the funnel is positioned below the flame element when the tailgate is in a vertically closed orientation.

19. The tailgate of claim 18, further comprising one or more interchangeable modules, wherein at least one of the one or more interchangeable modules comprises a cutting board, a storage tray, or a sound system.

20. The tailgate of claim 18, further comprising a fuel valve assembly.

\* \* \* \* \*